United States Patent [19]
Clough et al.

[11] Patent Number: 5,097,257
[45] Date of Patent: Mar. 17, 1992

[54] APPARATUS FOR PROVIDING OUTPUT FILTERING FROM A FRAME BUFFER STORING BOTH VIDEO AND GRAPHICS SIGNALS

[75] Inventors: Elizabeth A. Clough, Menlo Park; Steven G. Roskowski, Sunnyvale; Stephen G. Perlman, Mountain View; Anthony D. Masterson, Cupertino, all of Calif.

[73] Assignee: Apple Computer, Inc., Cupertino, Calif.

[21] Appl. No.: 456,320

[22] Filed: Dec. 26, 1989

[51] Int. Cl.$^5$ ............................................. G09G 1/00
[52] U.S. Cl. ................................. 340/814; 340/728
[58] Field of Search .............. 340/720, 728, 731, 811, 340/812, 813, 814; 358/11, 137, 140

[56] References Cited

U.S. PATENT DOCUMENTS 4,425,581  1/1984  Schweppe et al. .................. 340/814
4,484,188  11/1984  Ott ...................................... 340/728

FOREIGN PATENT DOCUMENTS

2640759  3/1978  Fed. Rep. of Germany ...... 340/728

Primary Examiner—Jeffery A. Brier
Attorney, Agent, or Firm—Blakely, Sokoloff, Taylor & Zafman

[57] ABSTRACT

An arrangement which includes apparatus for signifying the source of data to be displayed, apparatus for generating lines of data to fit between the lines of interlaced data to be presented on a non-interlaced output display device, and apparatus for generating lines of data to be presented on an interlaced display from a larger number of lines representing non-interlaced data.

7 Claims, 5 Drawing Sheets

Table 1

| line providing pixel data to: | | | Output of circuit | used in current implementation |
|---|---|---|---|---|
| input [33] | input [34] | input [35] | | |
| 0 | 0 | 0 | line[0] | X |
| 0 | 0 | 1 | 3/4*line[0]  +  1/4*line[1] | |
| 0 | 0 | 2 | 3/4*line[0]  +  1/4*line[2] | |
| 0 | 1 | 0 | 1/2*line[0]  +  1/2*line[1] | |
| 0 | 1 | 1 | 3/4*line[1]  +  1/4*line[0] | |
| 0 | 1 | 2 | 1/4*line[0]  +  1/2*line[1]  +  1/4*line[2] | X |
| 0 | 2 | 0 | 1/2*line[0]  +  1/2*line[2] | X |
| 0 | 2 | 1 | 1/4*line[0]  +  1/2*line[2]  +  1/4*line[1] | |
| 0 | 2 | 2 | 3/4*line[2]  +  1/4*line[0] | |
| 1 | 0 | 0 | 3/4*line[0]  +  1/4*line[1] | |
| 1 | 0 | 1 | 1/2*line[0]  +  1/2*line[1] | |
| 1 | 0 | 2 | 1/4*line[2]  +  1/2*line[0]  +  1/4*line[1] | |
| 1 | 1 | 0 | 3/4*line[1]  +  1/4*line[0] | |
| 1 | 1 | 1 | line[1] | X |
| 1 | 1 | 2 | 3/4*line[1]  +  1/4*line[2] | |
| 1 | 2 | 0 | 1/4*line[0]  +  1/2*line[2]  +  1/4*line[1] | |
| 1 | 2 | 1 | 1/2*line[2]  +  1/2*line[1] | |
| 1 | 2 | 2 | 3/4*line[2]  +  1/4*line[1] | |
| 2 | 0 | 0 | 3/4*line[0]  +  1/4*line[2] | |
| 2 | 0 | 1 | 1/4*line[2]  +  1/2*line[0]  +  1/4*line[1] | |
| 2 | 0 | 2 | 1/2*line[0]  +  1/2*line[2] | |
| 2 | 1 | 0 | 1/4*line[0]  +  1/2*line[1]  +  1/4*line[2] | |
| 2 | 1 | 1 | 3/4*line[1]  +  1/4*line[2] | |
| 2 | 1 | 2 | 1/2*line[2]  +  1/2*line[1] | |
| 2 | 2 | 0 | 3/4*line[2]  +  1/4*line[0] | |
| 2 | 2 | 1 | 3/4*line[2]  +  1/4*line[1] | |
| 2 | 2 | 2 | line[2] | X |

FIGURE 4

Table 2

| Type of data of pixel from line[n-1] | Type of data of pixel from line[n] | Type of data of pixel from line[n-1] | Resulting Operation for Interlaced Monitor | Resulting Operation for Non-Interlaced Monitor |
|---|---|---|---|---|
| Graphics | Graphics | Graphics | Convolution | No Interpolation |
| Graphics | Graphics | Video | Convolution | No Interpolation |
| Graphics | Video | Graphics | Convolution | No Interpolation |
| Graphics | Video | Video | Convolution | Following line used |
| Video | Graphics | Graphics | Convolution | No Interpolation |
| Video | Graphics | Video | Convolution | No Interpolation |
| Video | Video | Graphics | Convolution | Previous line used |
| Video | Video | Video | No Convolution | Interpolation |

FIGURE 5

APPARATUS FOR PROVIDING OUTPUT FILTERING FROM A FRAME BUFFER STORING BOTH VIDEO AND GRAPHICS SIGNALS

BACKGROUND OF THE INVENTION

1. Field of the Invention

This invention relates to computer graphics systems and, more particularly, to methods and apparatus for deriving from a frame buffer signals originating from both interlaced and non-interlaced formats for presentation on either an interlaced or non-interlaced output display monitor.

2. History of the Prior Art

It is the vision of many that in the near future a person sitting at a personal computer will be able to call up on the screen of the computer monitor information from a myriad of sources. For example, it is expected that a person will be able to hear telephone and radio communications, view television or recorded motion pictures, play stereo recordings of music, and operate computer graphical and text programs. It is also expected that all of these operations will be possible at the same time so that, for example, a television program may be displayed in one window while a computer graphics program is running in another window or computer graphics material may be displayed as an overlay on the television program.

It has long been recognized by those skilled in the art that is much easier to visualize the wonderful results that one would like than to reach those results, especially where the results require the combining of television (video) signals with computer graphics signals on the same output monitor. The crux of the problem is that, although both types of signals are electrical, they arrive in entirely different formats for their two purposes. The television signals are analog signals. It is desirable that these analog television signals be converted to digital representations for presentation on a computer monitor so that they may be moved and manipulated and the television window in which they appear may be resized. Moreover, in the United States the video signals are presented in accordance with the NTSC standard in an interlace pattern of a first field of 240 lines followed one-sixtieth of a second later by a second field of 240 lines to form a complete picture. In Europe, a PAL standard interlace pattern consists of a first field of 288 lines followed one-fiftieth of a second later by a second field of 288 lines to form a complete picture. Obviously, other standards are possible. From this point on, only the U.S. standard will be used in the discussion though other standards should be considered to be included. This interlaced method of presentation allows a less expensive monitor to present pictures which are entirely acceptable for television. However, such a monitor is not acceptable for computer graphics where much more detail must be displayed and manipulated. Consequently, a typical computer display presents 480 lines of data in a non-interlaced mode.

Thus, the data from these two different sources of two different types, interlaced and non-interlaced, must somehow be presented in a form which can be handled by a personal computer. The usual method suggested is to convert the video data and place it in a first frame buffer, place the computer data in a second frame buffer, and somehow switch between the two frame buffers in presenting the data to an output monitor. Another more difficult method would be to somehow place all of the data from the two sources in the same frame buffer; again, the problem remains of how to switch the data to an output monitor.

The reason that this is a problem is two-fold. First, the data is stored in one or two frame buffers in interlaced form if it came from a video source and in non-interlaced form if it is computer data. The visionary also expects to be able to present the output on either an interlaced television type monitor or a computer monitor of some sort. Thus, it is desirable that the operator be able to combine video data from an interlaced source (hereinafter called interlaced data) and non-interlaced computer data and display both forms of data on both interlaced and non-interlaced monitors without disconcerting visual effects.

Presenting interlaced data on a monitor designed to display interlaced signals is not a problem; such a monitor simply takes the 240 lines of interlaced information available in a first field and presents it on the 240 lines available on the monitor. Then it follows this with the next 240 lines which are interleaved and offset in time to make up the complete picture.

However, presenting the non-interlaced data on a monitor designed to display interlaced signals is a greater problem. Non-interlaced data has 480 lines which are not offset in time. If every other line is displayed to make up a first field and then the alternate 240 lines are displayed to make up an interleaved second field, the fact that the computer graphics is of higher resolution causes flickering which is disconcerting to the viewer. Consequently, the lines of the non-interlaced computer display must somehow be adapted to appear correct to the viewer when presented on an interlaced output monitor.

In a similar manner, presenting non-interlaced data on a monitor designed to display non-interlaced signals is not a problem; for such a monitor simply takes the 480 lines of non-interlaced information available and presents it all on the monitor. However, presenting the interlaced data on a monitor designed to display non-interlaced signals is a greater problem. Interlaced data has only 240 lines per field followed by a second 240 lines which are offset in time. If both sets of 240 lines are displayed together to make up a non-interleaved frame of 480 lines, the fact that lines which are time offset are presented together provides a picture which is incorrect when motion occurs. Consequently, the lines of the interlaced video display must somehow be adapted to appear correct to the viewer when presented on an non-interlaced output monitor.

Thus, it is clear that whether a monitor is designed to present either interlaced or non-interlaced data, you must somehow change some of the data if both types are to be displayed on the same monitor.

SUMMARY OF THE INVENTION

It is, therefore, an object of the present invention to provide an arrangement for filtering both interlaced and non-interlaced data to be presented on either an interlaced or a non-interlaced display monitor.

It is another more specific object of the present invention to provide a simple economical circuit capable of translating interlaced data into non-interlaced data and non-interlaced data into interlaced data.

These and other objects of the present invention are realized in an arrangement which includes means for signifying the source of data to be displayed, means for generating lines of data to fit between the lines of interlaced data to be presented on a non-interlaced output display device, and means for generating lines of data to be presented on an interlaced display from a larger number of lines representing non-interlaced data.

These and other objects and features of the invention will be better understood by reference to the detailed description which follows taken together with the drawings in which like elements are referred to by like designations throughout the several views.

BRIEF DESCRIPTION OF THE DRAWINGS

FIG. 4 illustrates a table useful in explaining the operation of the invention.

NOTATION AND NOMENCLATURE

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art.

An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing the operations of the present invention include general purpose digital computers or other similar devices. In all cases the distinction between the method operations in operating a computer and the method of computation itself should be borne in mind. The present invention relates to apparatus and to method steps for operating a computer in processing electrical or other (e.g. mechanical, chemical) physical signals to generate other desired physical signals.

DETAILED DESCRIPTION OF THE INVENTION

Figure 1:
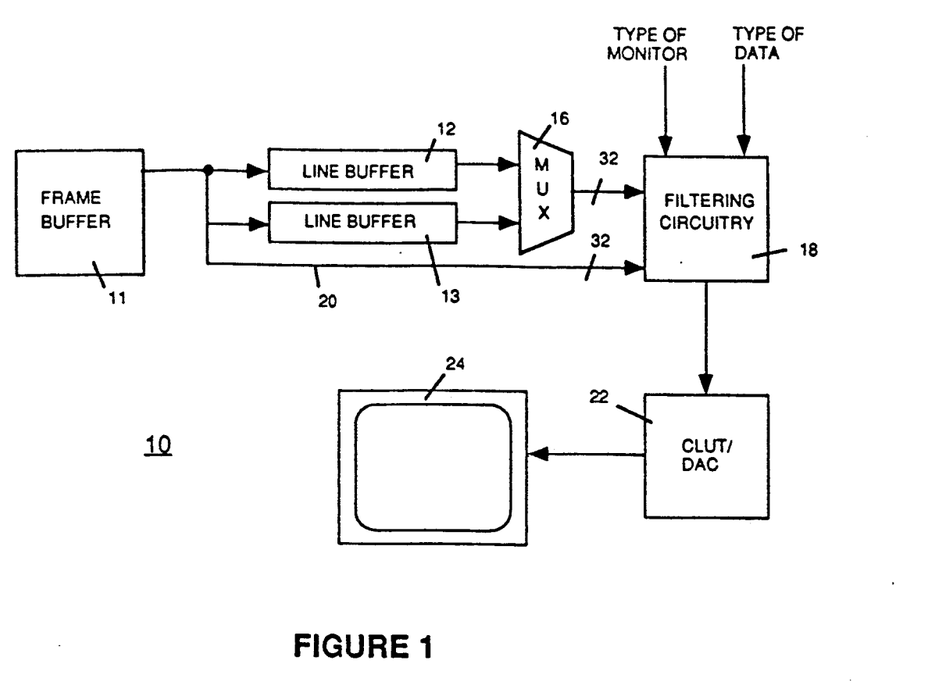
FIG. 1 is a block diagram illustrating the arrangement of the invention for translating interlaced data into non-interlaced data and non-interlaced data into interlaced data.

Referring now to FIG. 1, there is shown a block diagram of a circuit 10 in accordance with the invention which may be used for translating interlaced data into non-interlaced data and non-interlaced data into interlaced data for presentation on output display monitors capable of displaying either interlaced data or non-interlaced data. The circuit 10 may be associated with a single frame buffer 11 which holds both video and computer graphics information which has been mixed together prior to storage. Alternatively, two frame buffers storing separately the information for video display and for graphics display may be utilized with some means interposed between those buffers and the circuit 10 for selecting which information is to be transferred from which frame buffer at what time to the circuit 10. From this point, the circuitry will be discussed as though a single frame buffer were in use, that frame buffer being constructed as video random access memory (VRAM) provided with a shift register for shifting data to the circuit 10 one line at a time.

In either case, a first line buffer 12 and a second line buffer 13 each capable of storing one line of information (1,134 words each having thirty-two bits per word in a preferred embodiment) from a single frame buffer are provided. In the storage scheme for which the present invention is provided, each line of information in the line buffer is made up of bits representing each pixel to appear on the output monitor arranged serially. If a pixel includes twenty-four bits of red-green-blue color information, then those bits are arranged serially in three bytes of eight bits each for each pixel of the line within the line buffers 12 and 13. If, on the other hand, a pixel includes eight bits of black and white gray scale information, then those bits are arranged serially in eight bit bytes, one byte for each of the four pixels in each word within the line buffers 12 and 13.

A multiplexor 16 furnishes input signals from the line buffers 12 and 13 to a filtering circuit 18. Another input to the filtering circuit 18 is provided from the frame buffer 11. Thus, in operation, a first line from the frame buffer 11 may be shifted and latched into the line buffer 12, a next line into the line buffer 13, and a third line may appear in real time on the input line 20 providing pixels from three adjacent lines of the frame buffer 11 at the input to the filtering circuit 18.

The filtering circuit 18 simply transfers the data in the condition it is received if it is either interlaced data to be presented on an interlaced monitor or non-interlaced data to be presented on a non-interlaced monitor. However, circuit 18 translates (or filters) interlaced data to be presented on a non-interlaced monitor in a first manner and translates (or filters) non-interlaced data to be presented on an interlaced monitor in a second manner. The original and filtered pixels from the filtering circuit 18 are transferred to circuitry 22 including color-look-up tables and digital-to-analog converting circuitry the makeup of each of which is well known to those skilled in the art. From the circuitry 22 the signals are transferred to the appropriate output display monitor 24 for presentation.

Figure 2A:
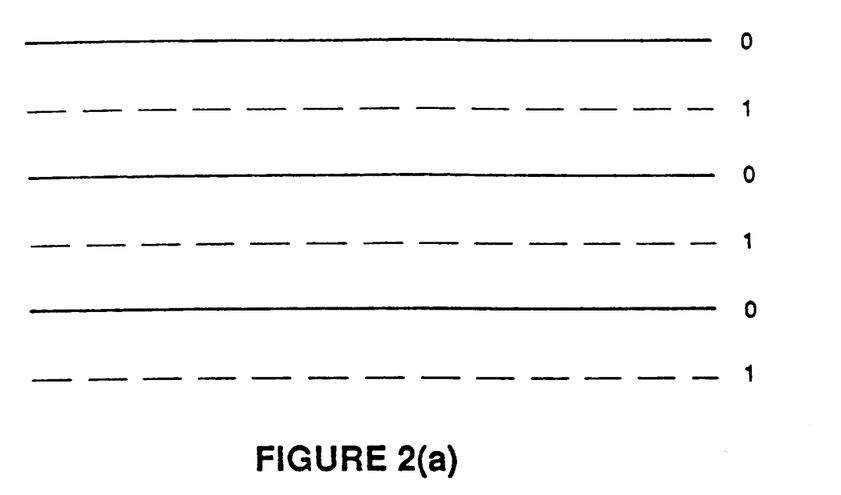
FIG. 2(a) illustrates the lines of an interlaced video signal.

Interlaced data stored in a frame buffer to be presented on a monitor designed to display interlaced signals includes a first 240 lines of information available for a first field and a second 240 lines which are interleaved and offset in time to make up the complete picture. FIG.

2(a) illustrates two fields stored in a frame buffer holding only video data. The lines 0 actually represent a time one-sixtieth of a second prior to that of the lines 1 so that the lines may be represented at one-sixtieth of a second intervals on an interlaced monitor.

However, presenting the interlaced data on a monitor designed to display non-interlaced signals cannot be accomplished so easily. If all 480 lines are displayed at one time and motion has occured between the interlaced halves of the frame, the result will be peculiar. Consequently, the two halves of the interlaced frame should never be presented in the same frame on a non-interlaced monitor. Instead, the lines of each half frame are presented separately. In order to present a full 480 lines on the non-interlace monitor, the values of the pixels in lines above and below what would otherwise be a blank line are averaged, and the average value is used to define the pixel for the blank line. If the data is twenty-four bit color data, then the bits representing the red data are separately averaged, the bits representing the green data are separately averaged, and the bits representing the blue data are separately averaged. If the data represents black and white intensity values, then all of the bits for each pixel are averaged to produce a value for the blank line pixel. This method of averaging pixels to allow interlaced data to be presented on a non-interlaced monitor is referred to as interpolation and is known in the art.

It will be appreciated that the circuit 10 of FIG. 1 presents three individual lines of the frame buffer 11 to the filtering circuitry 18. Consequently, the circuitry 18 has at hand the information from the lines above and below what would otherwise be a blank line which the circuitry 18 needs to construct any individual pixel to be filled in during the interpolation process. Moreover, the information regarding the type of monitor on which the data is to be displayed and the type of data which is being handled is also made available to the circuitry 18 so that the circuitry 18 is apprised when interpolation of a pixel is necessary. For example, if separate frame buffers are used for video and graphics information, the frame buffer in which the information is stored provides the information on the type of data. If a single frame buffer is used, the type of data in each pixel must also be stored so that it may be related to the pixels as they are processed.

Figure 2B:
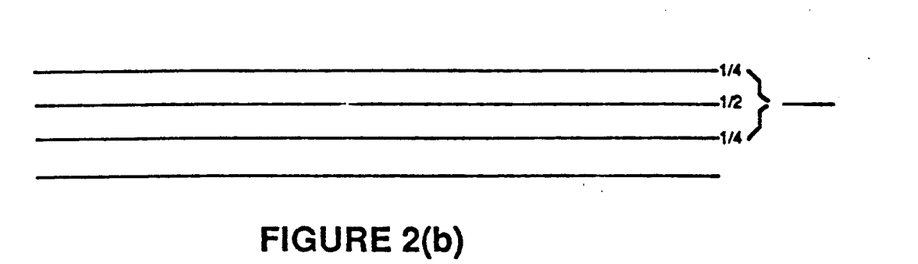
FIG. 2(b) illustrates the lines of a non-interlaced graphics signal.

As illustrated in FIG. 2(b), non-interlaced data has 480 lines which are not offset in time. The presentation of this data on an interlaced monitor also requires translation. If every other line were to be displayed to make up a first field and then the alternate 240 lines were displayed to make up an interleaved second field, the fact that there is higher resolution in the computer graphics data would cause flickering which is disconcerting to the viewer. Consequently, the lines of the non-interlaced computer graphics display must somehow be filtered to appear correct to the viewer when presented on an interlaced output monitor.

This is accomplished by a process referred to as convolution in which, if all lines are considered to be non-interlaced, 240 lines of a first field are generated by taking every other line of the frame buffer. For each such line, each pixel for that line is generated by including a quarter of the value of the pixel on the line above, a quarter of the value of the pixel on the line below, and one half the value of the pixel on the line. The values used for this purpose consitute a specific adaptation of an algorithm for vertical convolution described in U.S. patent application Ser. No. 07/290,182, entitled Video Vertical Filtering, Perlman et al, filed Dec. 23, 1988, assigned to the assignee of the present invention. This provides that each pixel generated includes a portion of the line above and the line below so that variations between lines are not too drastic to the viewer. Again, if the data is twenty-four bit color data, then the bits representing the red data are separately averaged, the bits representing the green data are separately averaged, and the bits representing the blue data are separately averaged, while if the data represents black and white shades, then all of the bits for each pixel are averaged to produce a value for the pixel. This method of generating pixels allows non-interlaced data to be presented on an interlaced monitor. The lines of a second field are generated in a similar manner using the other 240 lines.

As with the interpolated data, the circuit 10 of FIG. 1 presents three individual lines of the frame buffer 11 to the filtering circuitry 18 so that it has at hand the information which is needed to construct any individual pixel to be filled in during the convolution process. Moreover, the information regarding the type of monitor on which the data is to be displayed and the type of data which is being handled is also made available to the circuitry 18 so that the circuitry 18 is apprised when convolution of a pixel is necessary.

Figure 3:
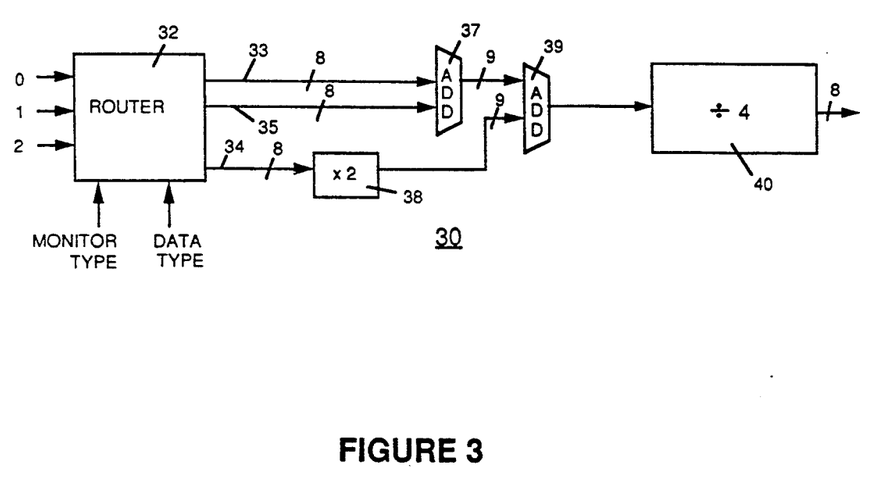
FIG. 3 is a block diagram of one portion of the arrangement illustrated in FIG. 1.

FIG. 3 illustrates a circuit 30 which may be utilized to implement the filtering circuitry 18 of FIG. 1. The circuit 30 includes a router 32 which is simply a series of gates adapted to provide the appropriate pixel values to the proper paths depending upon the operation to be accomplished. The router 32 receives data at its three input terminals 0, 1, and 2 which relate to a pixel from a particular line of the frame buffer, a pixel from the line above, and a pixel from the line below. The router 32 also receives information defining the monitor type on which the information is to be presented and the type of data being handled.

The router 32 receives input data representing the pixel values and transfers that data in eight bit groups representing either red, green, blue, or intensity via conductors 33, 34, and 35. The conductors 33 and 35 direct input to an eight bit adder 37. The conductors 34 direct input to a multiply-by-two circuit 38, then to a nine bit adder 39. The results of the addition accomplished by the adder 37 are furnished as a second input to the adder 39. The results of the addition of the adder 39 are furnished to a divide-by-four circuit 40. The results produced by the circuit 40 are furnished to the circuit 22 of FIG. 1 for display by the monitor 24.

Adder circuits are well known to those skilled in the art and will not otherwise be discussed here. Moreover, a one bit shifter to move the point of a binary number one bit provides a multiply-by-two circuit such as circuit 38 while a two bit shifter in the opposite direction may provide the divide-by-four circuit 40. It is desirable for the divide-by-four circuit to use round-off instead of truncation. This is accomplished by adding a value of two to the number prior to the two bit shift. The circuit 30 may be replicated four times so that it is able to provide parallel processing of all color bits of a twenty-four bit color pixel or for processing of four individual black and white eight bit pixels.

In operation, if the monitor type and the data type for a pixel are the same so that, for instance, interlaced video data is to be presented on an interlaced monitor, then the pixels of a line of data are simply to be transferred to the output path to the monitor. In such a case, the eight bits of the pixel value (red, green, blue, or black and white) are placed on all three groups of conductors 33, 34, and 35. The bits on the conductor 33 are added to the bits on the conductors 35 by adder 37. The results of this addition are added by adder 39 to the bits on conductors 34 which are doubled at a multiplier 38 to give a total equal to four times the original value at the input to the circuit 40. The circuit 40 divides the input value by four to produce the original value of the pixel which is then transferred to the output monitor.

If the monitor type and the data type for a pixel differ and interlaced data is to be displayed on a non-interlaced monitor, the pixels from every other line of the frame buffer will be treated as described above since these pixels are merely copied to the output display. On the other hand, the pixels generated by interpolation for the blank lines between these pixels are generated by placing the bits representing a pixel from the line above the pixel to be generated on both the conductors 33 and the conductors 35, and the bits representing a pixel from the line below the pixel to be generated on the conductors 34. The values on the conductors 33 and 35 are added by the adder 37. The value on the conductors 34 is doubled by the circuit 38 then added to the result from adder 37, to present a value at the input to the circuit 40 which is twice the sum of the pixel above and below the desired pixel. The circuit 40 divides this value by four to produce a value which is the average of the values of the pixels above and below the desired pixel. This value is transferred for display on the monitor 24.

The circuit 30 is fully programmable and is capable of providing a plurality of different combinations of weightings of the pixel values furnished on the input lines 0, 1, and 2. Table 1 illustrated in FIG. 4 lists the various outputs which may be produced by the circuit 30 and shows those which are of particular interest in the filtering arrangements preferred herein. Other outputs may be found to provide useful results.

In the case of a horizontal edge between interlaced and non-interlaced material, in order to display pixels in the uppermost or lowermost line of interlaced material on a non-interlaced display, the blank pixel to be filled by interpolation is generated by providing the value of the pixel from the line below or above to all three of the sets of conductors 33, 34, and 35 so that the final value is equal to the input value of that pixel.

If the monitor type differs from the pixel data type, and non-interlaced data is to be displayed on an interlaced monitor so that convolution is required, the router 32 provides the pixel above the desired pixel on the conductors 33, the pixel on the line of the desired pixel on conductors 34, and the pixel below the desired pixel on the conductors 35. The value of the pixel on the line of the desired pixel is thus doubled and added by adder 39 to the total of the values of the pixel on the line above and the pixel on the line below obtained from the adder 37. The result is divided by four by the circuit 40 to provide the correct value of one-quarter of the lines above and below and one-half the value of the desired line for transfer to the monitor 24.

Figure 5:
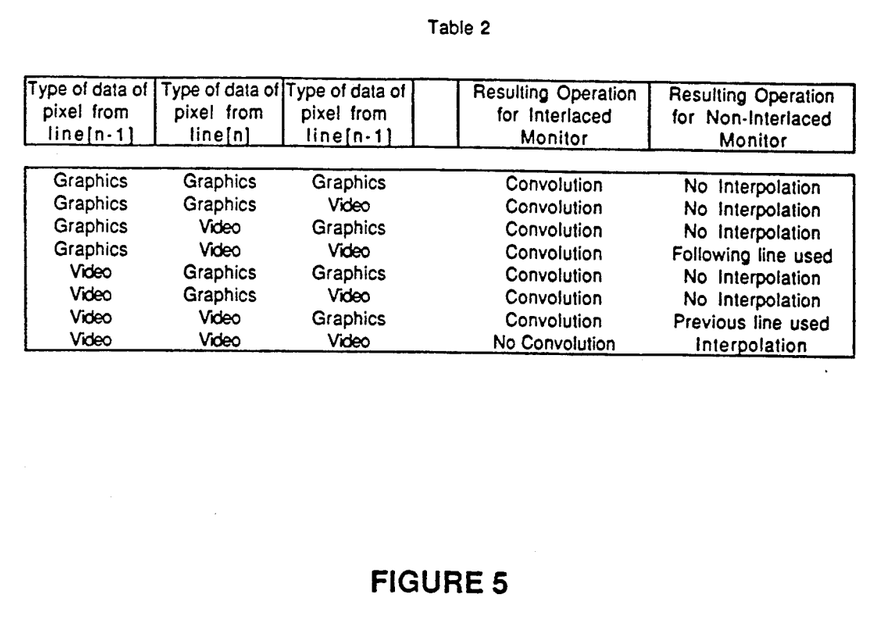
FIG. 5 illustrates another table useful in explaining the operation of the invention.

In the case of a horizontal edge between interlaced and non-interlaced material, in order to display pixels in the uppermost or lowermost line of non-interlaced material on a non-interlaced display and the line immediately adjacent, the usual method of convolution is used so that a value is actually generated which is a combination of pixels from interlaced and non-interlaced lines. Table 2 illustrated in FIG. 5 specifies that boundary conditions used in the preferred embodiment of the present invention in order to obtain the most visually acceptable changes between data types.

Thus, those skilled in the art will recognize that the circuitry of the present invention provides a simple and elegant solution to the problem of both interpolating and convolving data from video and graphic sources so that they may be presented on both interlaced and non-interlaced output monitors.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. A circuit for presenting data stored in both video and computer graphics form on interlaced and non-interlaced output monitors comprising a first signal signifying the type of data to be displayed, a second signal designating the type of monitor on which the display is to occur, and means for generating lines of data to fit between the lines of interlaced data to be presented on a non-interlaced output display device and for generating lines of data to be presented on an interlaced display from a larger number of lines representing non-interlaced data, said means for generating receiving said first signal and said second signal.

2. A circuit claimed in claim 1 for presenting data stored in both video and computer graphics form on interlaced and non-interlaced output monitors in which the means for generating lines of data to fit between the lines of interlaced data to be presented on a non-interlaced output display device and for generating lines of data to be presented on an interlaced display from a larger number of lines representing non-interlaced data comprises means for providing data representing a plurality of adjacent lines to be displayed, means for routing data representing selected ones of the plurality of adjacent lines to be displayed to first, second, and third output paths, means for doubling the value furnished on the third output path to produce a first result, means for adding a value placed on the first output path to a value placed on the second output path to produce a second result, means for adding the second result to the first result to produce a third result, and means for dividing the third result by four.

3. A circuit as claimed in claim 2 for presenting data stored in both video and computer graphics form on interlaced and non-interlaced output monitors in which the means for generating lines of data to fit between the lines of interlaced data to be presented on a non-interlaced output display device and for generating lines of data to be presented on an interlaced display from a larger number of lines representing non-interlaced data is replicated four times.

4. A circuit as claimed in claim 2 for presenting data stored in both video and computer graphics form on interlaced and non-interlaced output monitors in which the means for providing data representing a plurality of adjacent lines to be displayed comprises a first line buffer for storing a line of data, a second line buffer for storing a line of data, and means for presenting a third line of data.

5. A circuit as claimed in claim 4 for presenting data stored in both video and computer graphics form on interlaced and non-interlaced output monitors further comprising a multiplexor for selecting data from the first and second line buffers.

6. A circuit as claimed in claim 1 for presenting data stored in both video and computer graphics form on interlaced and non-interlaced output monitors in which the means for generating lines of data to fit between the lines of interlaced data to be presented on a non-interlaced output display device and for generating lines of data to be presented on an interlaced display from a larger number of lines representing non-interlaced data comprises means for providing data representing a plurality of adjacent lines to be displayed, and means for generating from the data representing a plurality of adjacent lines to be displayed pixel values equal to any selected pixel from the data representing a plurality of adjacent lines to be displayed, pixel values equal to the average of the pixel values of pixels above and below a selected pixel, and pixel values equal to a value assigning a first weight less than one to the selected pixel and lesser equal values to each of the pixels above and below the selected pixel.

7. A circuit as claimed in claim 1 for presenting data stored in both video and computer graphics form on interlaced and non-interlaced output monitors in which the means for generating lines of data to fit between the lines of interlaced data to be presented on a non-interlaced output display device and for generating lines of data to be presented on an interlaced display from a larger number of lines representing non-interlaced data comprises means for providing data representing a plurality of adjacent lines to be displayed, and means for generating from the data representing a plurality of adjacent lines to be displayed pixel values equal to any selected pixel from the data representing a plurality of adjacent lines to be displayed, pixel values equal to the average of the pixel values of pixels above and below a selected pixel, and pixel values equal to a value which is the sum of a quarter of the value of the pixels above and below the selected pixel and one-half the value of the selected pixel.

* * * * *